Jan. 26, 1960 F. J. RADA ET AL 2,922,259

LAMP AIM CORRECTION DEVICE

Filed March 24, 1958 8 Sheets-Sheet 1

INVENTORS
Frank J. Rada &
Richard M. Goodwin
BY R. F. Barnard
ATTORNEY

LAMP AIM CORRECTION DEVICE

Filed March 24, 1958 8 Sheets-Sheet 2

INVENTORS
Frank J. Rada &
Richard M. Goodwin
BY R. F. Barnard
ATTORNEY

INVENTORS
Frank J. Rada &
Richard M. Goodwin
BY R. P. Barnard
ATTORNEY

Jan. 26, 1960 F. J. RADA ET AL 2,922,259

LAMP AIM CORRECTION DEVICE

Filed March 24, 1958 8 Sheets-Sheet 4

INVENTORS
Frank J. Rada &
Richard M. Goodwin
BY
R. F. Barnard
ATTORNEY

Jan. 26, 1960 F. J. RADA ET AL 2,922,259

LAMP AIM CORRECTION DEVICE

Filed March 24, 1958 8 Sheets-Sheet 5

INVENTORS
Frank J. Rada &
Richard M. Goodwin
BY
R. F. Barnard
ATTORNEY

Jan. 26, 1960 F. J. RADA ET AL 2,922,259

LAMP AIM CORRECTION DEVICE

Filed March 24, 1958 8 Sheets-Sheet 6

INVENTORS
Frank J. Rada &
Richard M. Goodwin
BY
R. P. Barnard
ATTORNEY

INVENTORS
Frank J. Rada &
Richard M. Goodwin
BY R. P. Barnard
ATTORNEY

LAMP AIM CORRECTION DEVICE

Filed March 24, 1958

INVENTORS
Frank J. Rada &
Richard M. Goodwin
BY R. F. Barnard
ATTORNEY

United States Patent Office 2,922,259

Patented Jan. 26, 1960

2,922,259

LAMP AIM CORRECTION DEVICE

Frank J. Rada and Richard M. Goodwin, Anderson, Ind., assignors to General Motors Corporation, Detroit, Mich., a corporation of Delaware

Application March 24, 1958, Serial No. 723,504

19 Claims. (Cl. 51—134)

This invention relates to the manufacture of lamps and, more particularly, to a method and apparatus for manufacturing projection lamps of the type which are provided with an aiming plane having a known disposition with respect to the direction of the light beam projected therefrom. Lamps of this type are referred to herein as pre-aimed lamps. Such a pre-aimed lamp, as disclosed generally herein in conjunction with an illustrative embodiment of this invention, is fully described in United States Patent application Serial No. 515,684 entitled "Pre-Aimed Light Projector," filed June 15, 1955, issued as Patent No. 2,870,362, dated January 20, 1959, in the names of Charles F. Arnold and Edward N. Cole, and assigned to the assignee of this invention.

The feature of pre-aiming, such as is disclosed in the aforementioned application, permits aiming of the projection lamp upon installation for use by means of a geometrical instrument and with precision previously obtained only by optical aiming. In general, this is accomplished by providing on the lamp structure an aiming plane having a known angular relation to the direction of the light beam, or a selected portion thereof, projected from the lamp. The desirability of pre-aimed projection lamps, especially vehicle headlamps, becomes apparent from a consideration of known lamp production techniques and desired lamp performance.

In the manufacture of projection lamps such as vehicle headlamps, optical imperfections occur among successive lamps manufactured by the same apparatus and technique. This optical imperfection is manifested by lack of uniform relationship of the light beam direction and a selected geometrical axis of the lamp structure. Such relationship for each lamp is unknown and varies randomly because of insufficient precision in the relative positioning and characteristics of the parts of the optical system. Although there has been much effort to improve the manufacturing technique to insure the required precision, this effort has not yielded a commercially successful, optically perfect lamp. Consequently, the aiming of projection lamps, and particularly vehicle headlamps, with great accuracy has constituted an important problem in the development of improved vehicle lighting.

The numerous approaches in the prior art to the problem of aiming vehicle headlamps may be characterized generally as being either optical aiming or geometrical aiming. In optical aiming, the lamp is mounted on the vehicle and illuminated; the light beam is directed upon a simple, remotely located aiming screen or a more complex optical equivalent thereof and the beam pattern is positioned by directional adjustment of the lamp. Optical aiming of this type has proved to be disadvantageous because it requires elaborate equipment and often much space. It is, however, quite accurate.

In geometrical aiming, the lamp is mounted on the vehicle and a selected axis of the lamp structure is directionally adjusted with reference to one or more axes of the vehicle. Geometrical aiming is highly advantageous in that the aiming apparatus required is simple and inexpensive. The aiming may be performed quickly and without the necessity of a large space. However, until the development of the pre-aimed lamp as disclosed in the aforementioned application, geometrical aiming was inaccurate because the relation between the projected light beam direction and the selected axis of the lamp structure was unknown. In the pre-aimed lamp, however, this relation is incorporated with a known value into the lamp structure. Thus, geometrical aiming may now be accomplished with substantially the precision of optical aiming.

The present day commercial practice in the manufacture of lamps affords compelling advantages of efficient production even though it yields optically imperfect lamps. It is desirable, of course, to retain these advantages in the production of pre-aimed lamps. However, the provision of the pre-aimed feature requires an additional step or steps in the manufacture of projection lamps and, in order for a pre-aimed lamp to be produced economically so that it may attain widespread acceptance, production apparatus capable of high volume production is necessary. The production rate of the apparatus for providing the pre-aimed feature must be consistent with that of the apparatus for assembling the lamp itself. Additionally, the apparatus must be capable of performing the necessary operations upon the lamp structure with great precision so that each lamp may be aimed by a geometrical instrument with the accuracy of optical aiming as aforementioned.

Accordingly, it is an object and feature of this invention to provide a method and apparatus for manufacturing projection lamps of the pre-aimed type at a high rate of production and with great precision.

It is an additional object of this invention to provide means for accurately and rapidly ascertaining the direction of a projected light beam of a lamp, and for rapidly sensing or forming an aiming surface on the lamp in accordance with that ascertainment.

It is a further object of this invention to provide apparatus having an aiming station for locating the light beam of a projection lamp, and for providing the lamp structure with an aiming plane in a known relation to the direction of the light beam so that the lamp is adapted for accurate geometrical aiming.

It is yet another object and feature of this invention to provide apparatus including an aiming station for locating the light beam of a projection lamp, determining if structural alteration of the lamp is required to provide an aiming plane having a known angular relation with respect to the lamp beam axis, and means for altering the structure of the lamp in accordance with that determination if necessary.

It is yet another object and feature of this invention to provide lamp manufacturing apparatus including an aim inspection and correction station comprising automatic means for aiming the light beam of a projection lamp, a plurality of independently operable cutting tools which define a reference plane for engagement with structural portions of the lamp, and means responsive to the aiming apparatus to alter the structure of the lamp only when necessary to provide an aiming plane on the lamp, said alteration being done in accordance with a determination of the location of the light beam with respect to the aforementioned reference plane.

It is yet another object of this invention to provide an aim inspection and correction station in the lamp manufacturing apparatus, which station includes an aiming screen and a plurality of independently operable cutting tools which define a reference plane in a known position relative to the aiming screen, means for adjustably feeding a lamp into said tools which are actuated in accordance with the location of the light beam relative to the aforementioned reference plane, whereby the tools can alter the structure of the lamp if necessary to form an aiming plane thereon having a known angular relation with respect to the light beam axis, and with a minimum of stock removal from the lamp structure.

It is yet another object and feature of this invention to provide lamp manufacturing apparatus comprising an aim inspection and correction station including an aiming screen and independently operable stock-removing devices adapted to act upon plural spaced points of a lamp structure, and in which said stock-removal devices form a reference plane to initially inspect and determine the directivity of the light beam from the lamp relative thereto, and which tools may be independently operated to remove stock from the spaced points of the lamp as the latter is fed toward the tools so as to form an aiming plane on the lamp.

It is yet another object of this invention to provide a lamp manufacturing apparatus including tools for altering the structural arrangement of the lamp to provide an aiming plane thereon having a known angular position with respect to the light beam axis, and which apparatus functions to inspect individual lamps to determine if the lamp needs to be structurally altered to be acceptable.

It is yet another object of this invention to provide the aforedescribed apparatus with control means for activating individually operable stock removing tools for altering the structural characteristics of a lamp by removing a minimum amount of material therefrom.

In general, these and other objects are obtained by the provision in a lamp manufacturing apparatus of an aim inspection and correction station comprising an aiming screen, individually operable grinding wheels and a lamp support which is movable relative to the grinding wheels. The grinding wheels define a reference plane having a known position, such as parallel, to the aiming screen which is provided with light-sensitive means to determine the location of the light beam projected from a lamp mounted in the aforementioned support. The lamp support includes means for yieldably and adjustably urging aiming projections on the lamp into engagement with the grinding wheels with a slight pressure. With the lamp aiming projections so engaged, and with the light source illuminated to project a beam of light on the aiming screen, inspection means is provided including the aforementioned light-sensitive means to determine if the light beam falls within a tolerance area on the screen; that is, if the light beam direction is known within tolerances relative to the reference plane and the aiming plane on the lamp defined by the aiming projections. If the direction of the light beam is as desired relative to the lamp aiming plane and the reference plane provided by the grinding wheels, the inspection means prevents any grinding operation from occurring. However, if the light beam should fall outside the tolerance area determined by the light-sensitive means on the aiming screen, the inspection means will signal the grinding wheels to begin grinding in a predetermined sequence to correct the position of the aiming plane by removing stock from the aiming projections of the lamp. As the aiming projection or projections are ground, the lamp support will feed the lamp into the operating grinding wheel with a slight pressure; that is, as grinding occurs, the lamp will be pivoting about one or more of its aiming projections as another projection is being ground. As a result of this grinding action, the light beam will shift into the tolerance area of the aiming screen, which fact will be signalled to the grinding wheels thereby stopping their action. At this time, an aiming plane as defined by the projections on the lamp is formed which is parallel to the reference plane provided by the grinding wheels which, in turn, has a known position with respect to the aiming screen. Thus, an aiming plane is provided on the lamp having a known angular position with respect to the actual light beam axis.

Thus, according to the teachings of this invention, the aiming station functions in the first instance as an inspection device to determine if any corrective structural alteration is required on the lamp to form an aiming plane. If no such structural alteration is required, none takes place. However, so long as the light beam is outside of the desired or tolerance area on the aiming screen, the grinding tools will act to grind those aiming projections required in order to provide the desired beam aim relative to the aiming plane on the lamp.

The apparatus and its function will become more apparent as the description of the invention proceeds, and in which reference is made to the following drawings in which.

Figure 1:
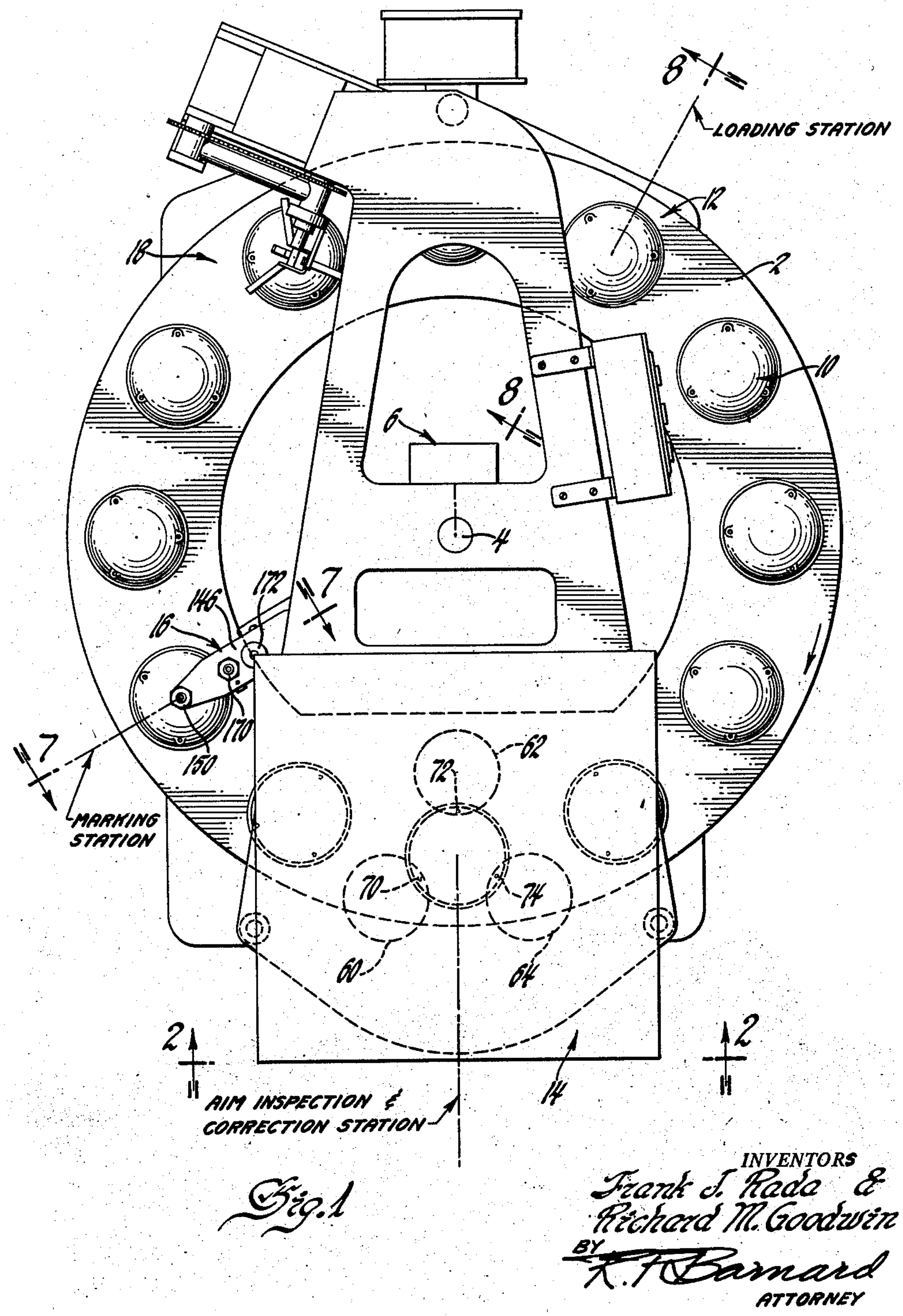
Figure 1 is a plan view of the lamp manufacturing apparatus of this invention.

Referring now to Figure 1, there is shown a rotary turret or dial 2 which is adapted to be rotatably supported on an upstanding vertical shaft 4 and sequentially indexed by an intermittent drive mechanism indicated generally at 6. The rotary turret 2 is provided with a plurality of support heads or nests to be described hereinafter, each of which is adapted to receive a projection lamp 10. The rotary turret is sequentially indexible by the intermittent drive mechanism 6 among various operating stations including a loading station 12, an aim inspection and correction station 14, marking station 16 and an unloading station 18.

Figure 8:
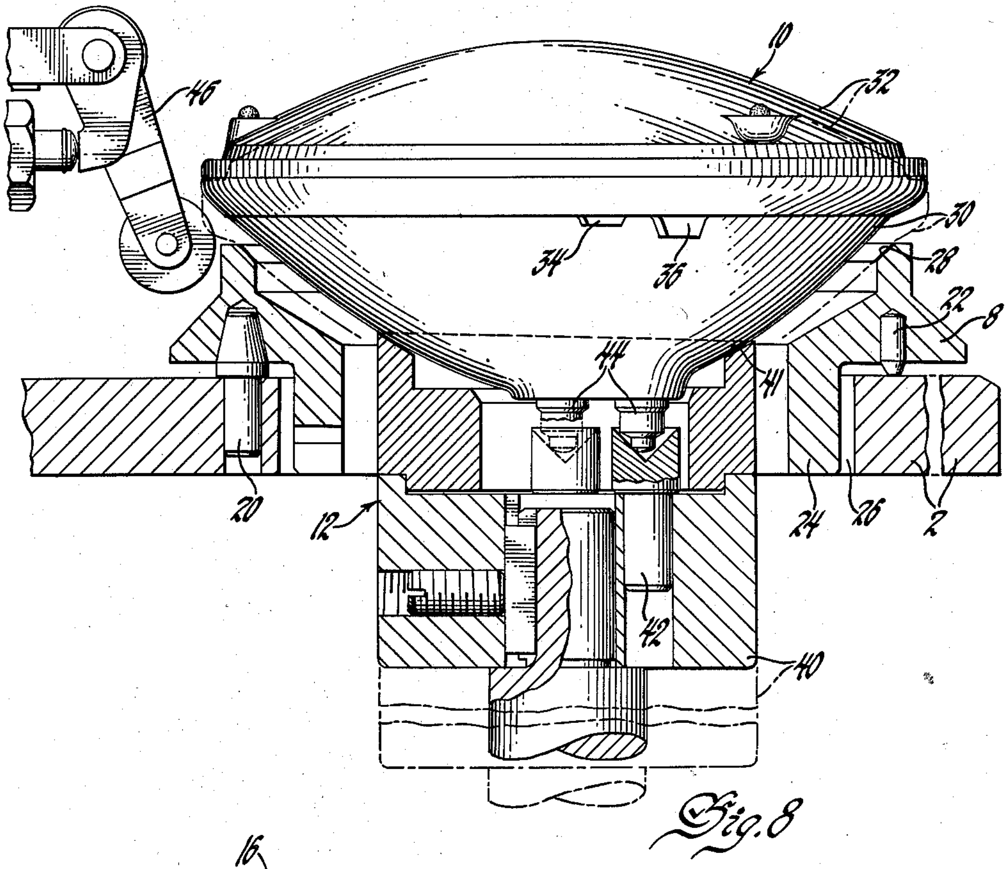
Figure 8 is a cross sectional view taken on line 8—8 of Figure 1 showing the loading station of the apparatus.

Referring now particularly to Figure 8 showing the loading station 12, it may be seen that the aforementioned lamp support heads include a nest 8 adapted to be oriented with respect to the turret 2 by means of a plurality of pins 20 removably seated in suitable apertures in the turret and having a frusto conical head portion seating in similarly formed openings about the periphery of the nest. In addition, a plurality of spaced pins 22 are secured to the periphery of the nest and rest upon the upper surface of the turret 2. The pins 22 prevent the nest from cocking or wobbling on the turret 2 particularly in the marking station 16 as will appear hereinafter. The nest 8 has a substantially cylindrical skirt 24 extending downwardly through an opening 26 in the turret 2. An annular tapered seat 28 at the rim of the nest is adapted to support the reflector 30 of the sealed lamp unit 10 which also includes the lens 32 as will be apparent to those skilled in this art. The usual lamp seating lugs 34 engage the rim of the nest 8, while the usual mounting lugs 36 are adapted to be seated in similarly shaped notches 38 in the rim of the nest as is shown more clearly in Figure 3.

A vertically reciprocable pedestal 40 extends into the nest opening defined by the skirt 24, and has an annular tapered rim portion 41 engageable with the reflector 30, and a plurality of triangularly positioned pins 42 each of which has a conical depression therein for receiving the usual metal ferrules 44 on the base of the lamp 10. Suitable means such as a fluid actuated motor or a foot-operated pedal is connected to the pedestal 40 for reciprocating the latter within the nest opening defined by the skirt 24. It will be apparent that with the pedestal 40 disposed in the full line position of Figure 8, a lamp 10 comprising the sealed lens and reflector elements 32 and 30, respectively, having the metal ferrules 44 on the base of the reflector, will be seated upon the pedestal 40 with the reflector 30 engaging the annular tapered seat 41 and the ferrules 44 positioned within the conical depressions in respective pins 42. By the suitable means aforementioned, the pedestal 40 may then be lowered as indicated in dotted lines in Figure 8 to seat the surface of the reflector 30 upon the tapered surface 28 of the nest 8. A limit switch 46 is also provided to insure that the lamp is properly seated on its nest prior to indexing of the turret 2 toward the aim inspection and correction station 14. If a lamp should become cocked so as not to be properly seated upon its nest, the limit switch 46 will not be actuated which will result in inoperation of the indexing mechanism 6 to move the turret. Naturally, the pedestal 40 is lowered sufficiently so as to be clear of the turret 2 prior to the indexing operation.

Reference will now be made more particularly to Figures 2 through 6, inclusive, showing the aim inspection and correction station 14 into which properly nested lamps 10 will be sequentially indexed from the loading station by the drive mechanism 6. The apparatus of the aim inspection and correction station is mounted on a superstructure including the upper mounting plate 48 and lower mounting plate 50 suitably rigidly connected in spaced relation by a plurality of supporting pillars 52. An enclosure or shroud 54 is mounted on the upper plate 48 and has disposed at its opposite end an aiming screen 56 on which the beam from a lamp 10 may be projected. Moreover, a supporting shroud 58 may also be provided on the upper mounting plate 48 to support a condensing lens for use in the aiming operation as is well known in this art. Three grinding wheels 60, 62 and 64 are supported over the lamp 10 by a collar 66 suspended from the upper mounting plate by a plurality of rods 68. It will be noted that each grinding wheel is disposed relative to an aiming projection or boss 70, 72 and 74, respectively, on the lamp so that the periphery of each grinding wheel overlies a boss while forming an opening between the grinding wheels through which a beam of light may be thrown from the lamp to the aiming screen 56. This relationship of the grinding wheels is more clearly shown in Figure 1. Each of the grinding wheels aforementioned is adapted to be rotatably driven by suitable means such as air motors 80, 82 and 84, respectively.

A nest and lamp support and controlling mechanism is indicated generally at 86 and includes a vertically reciprocable hollow pedestal 88 secured to the movable piston element of an air-actuated nest motor 90 secured to the lower mounting plate 50 and enclosed within the base of the apparatus. The upper rim of the pedestal 88 includes a plurality of circumferentially spaced upstanding projections 92 having substantially V-shaped teeth 94 adapted to engage similarly shaped openings 96 in the lower rim of the nest skirt 24 thereby enabling upward movement of the nest off of the locating pins 20 as indicated particularly in Figure 4.

A lamp support and feeding mechanism is disposed within the hollow pedestal 88 for reciprocable movement relative to the latter and includes a substantially cylindrical hollow barrel 98 having an end cap or plate 116 closing off the interior thereof. The end plate 116 is so formed as to cooperate with the interior wall of the barrel 98 to form a plurality of deep wells or cavities 118, herein shown to be three in number corresponding to the number of ferrules 44 on the lamp.

Figure 3:
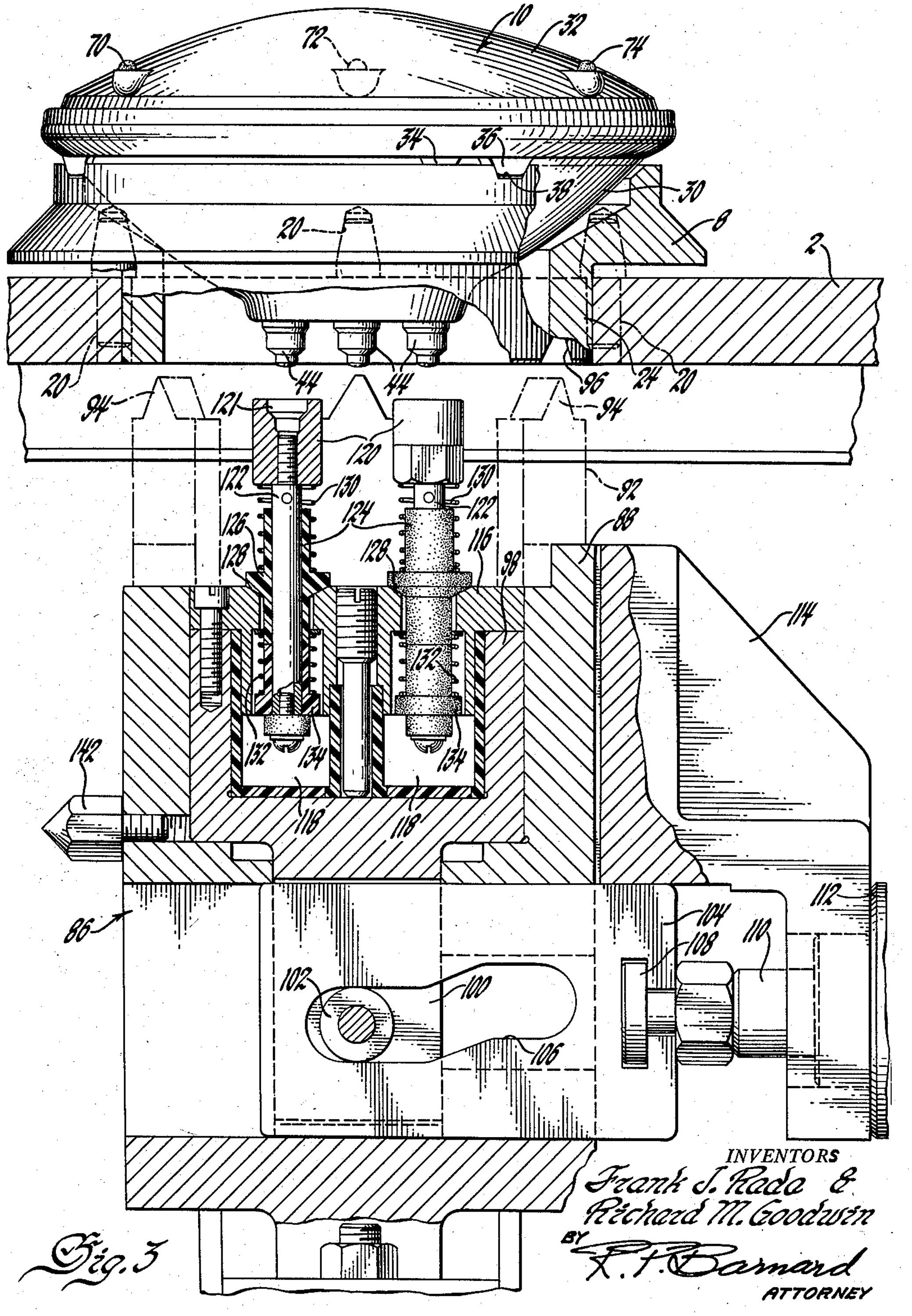
Figure 3 is an enlarged cross sectional view in elevation of the lamp supporting structure shown in Figure 2.

The walls of the cavity 118 may be lined, if desired, with a suitable material such as nylon as is indicated in Figure 3. Ferrule support and contact members 120 each have a suitably shaped depression 121 at the head end thereof aligned with the respective ferrules 44 on the lamp. Support and contact members 120 are each secured to a rod 122 which is reciprocably disposed through a bearing tube 124 which is preferably made of nylon. The nylon bearing tubes are each provided with a radially extending shoulder 126 having a tapered portion 128 adapted to seat on a similarly tapered portion of the end cap or plate 116. Moreover, it will be noted that the lower portion of each bearing tube 124 is slightly radially inwardly spaced from the adjacent wall of the respective wells 118. In order to maintain the contact members 120 in a reference position as indicated in Figure 3, a spring 130 surrounds the upper end of each bearing tube 124 and extends between a shoulder on the contact members 120 and the shoulder 126 of each bearing tube thereby urging the rods 122 upwardly. This upward urging force of the springs 130 is opposed and balanced by springs 132 surrounding the lower portions of each bearing tube and being seated against the cap or plate 116 and a shoulder 134 at the lower end of each tube. The tapered bearing between the shoulders 126 of each of the nylon tubes and the end cap or plate 116 permits a degree of pivotal or swivelling adjusting movement of the ferrule support members 120 for a purpose to appear more fully hereinafter.

The barrel portion 98 of the aforementioned lamp support and feeding mechanism includes the spaced downwardly extending legs 100 between which a cam follower roller 102 is rotatably mounted on a pin. A cam plate or slide 104 extends between the legs 100 for reciprocable movement therebetween, and has a cam trackway 106 in which the follower roller 102 rides. The cam plate is secured as shown at 108 to the piston rod 110 of an air-actuated lamp motor 112 which is rigidly secured to the nest controlling pedestal 88 by suitable means such as the bracket 114.

Figure 2:
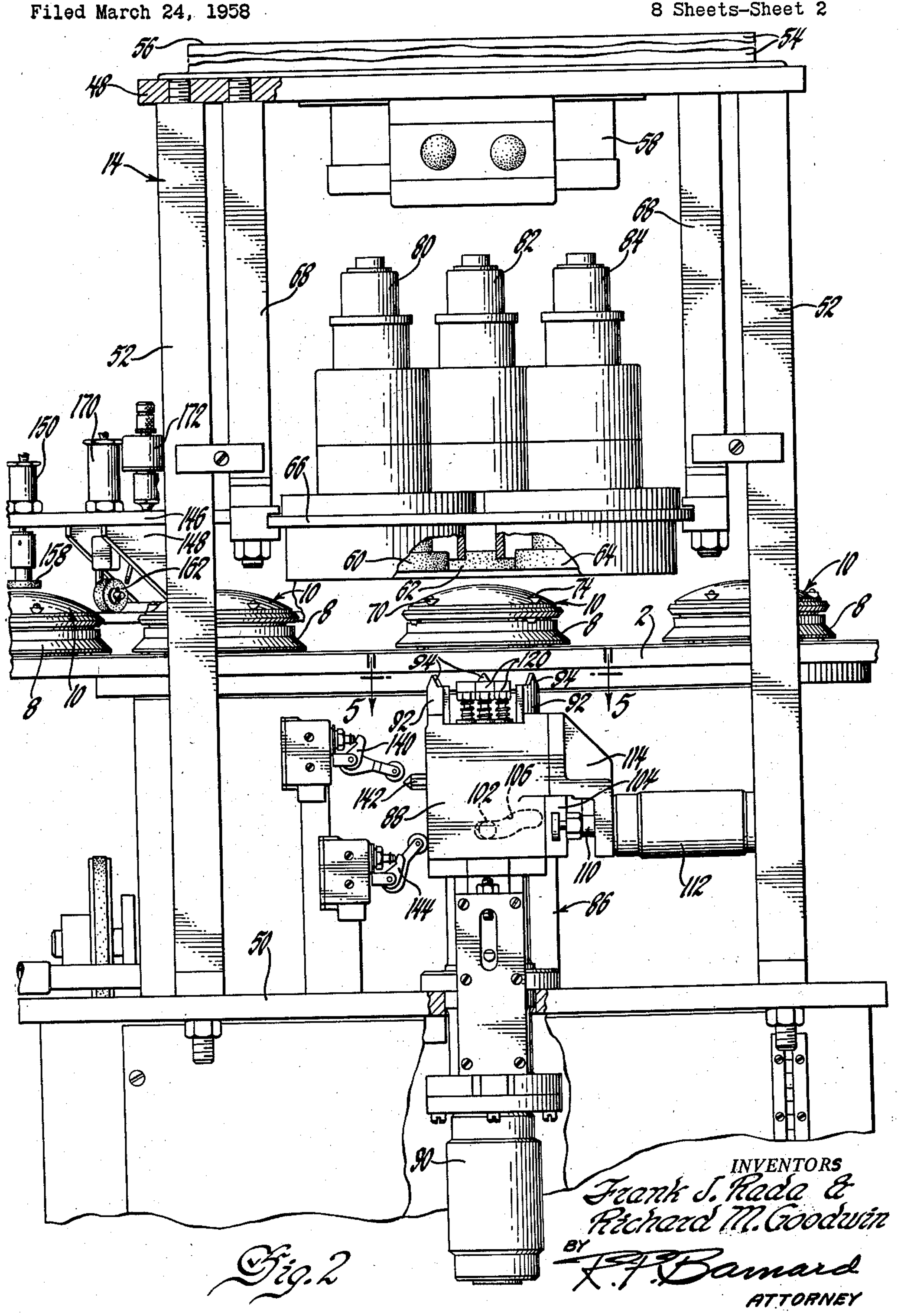
Figure 2 is an elevational view, partly broken away, taken, on line 2—2 of Figure 1, showing the aim inspection and correction station of the apparatus.
Figure 4:
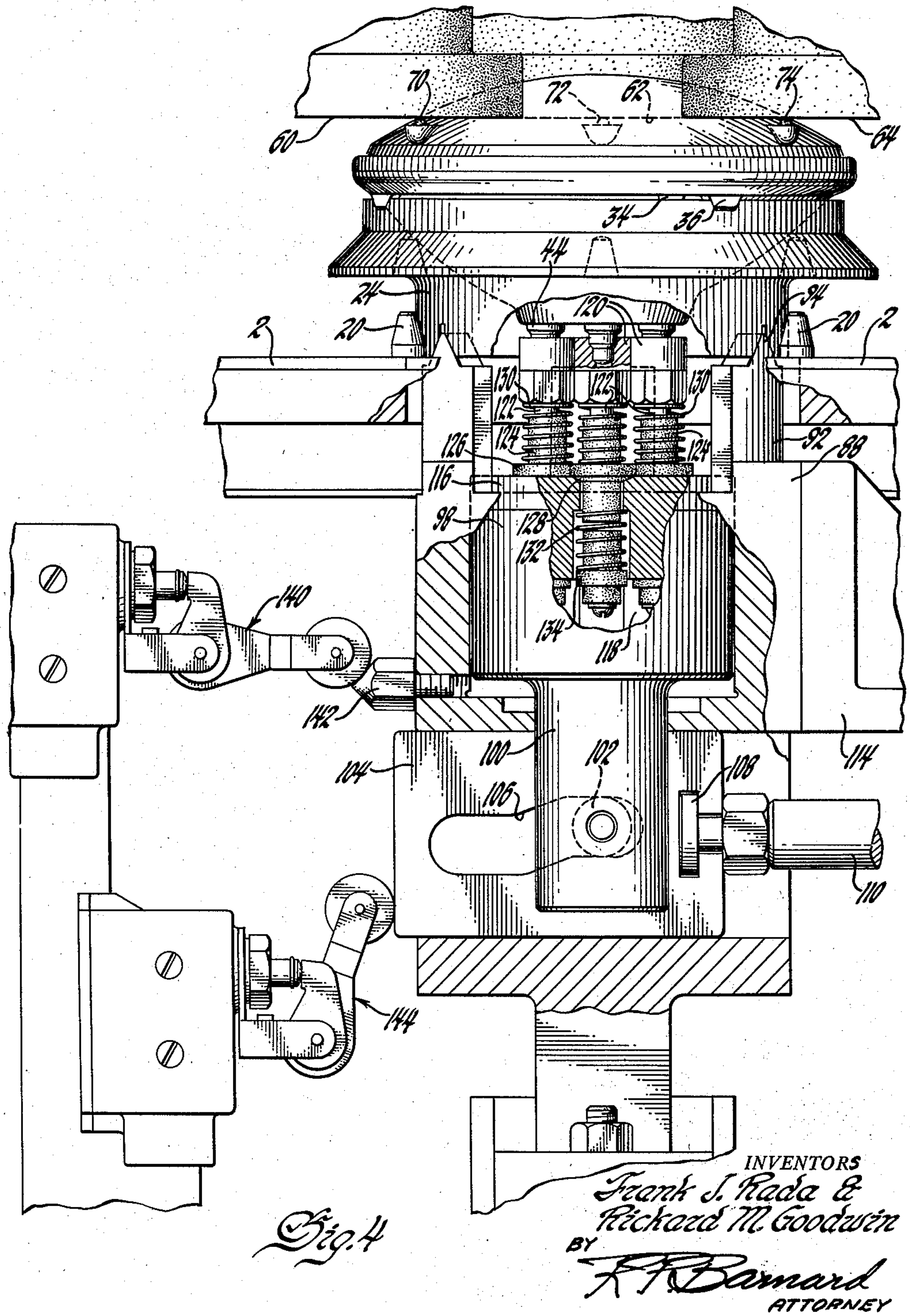
Figure 4 is a view similar to Figure 3, partly in section and partly broken away, showing the disposition of the lamp supporting structure when aim inspection and correction taken place.
Figure 5:
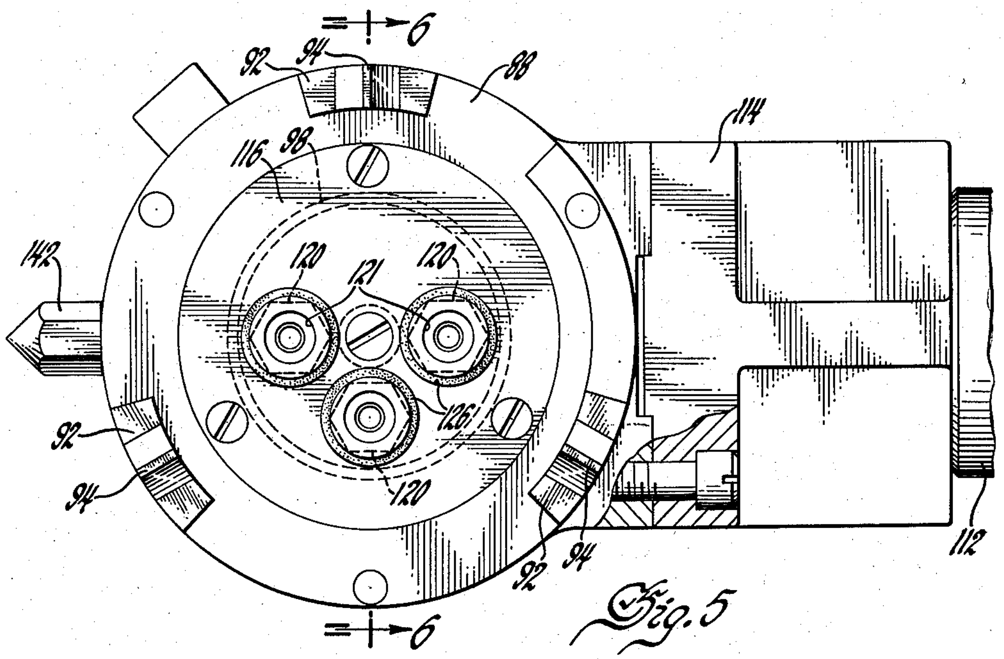
Figure 5 is an enlarged cross sectional view taken on line 5—5 of Figure 2.
Figure 6:
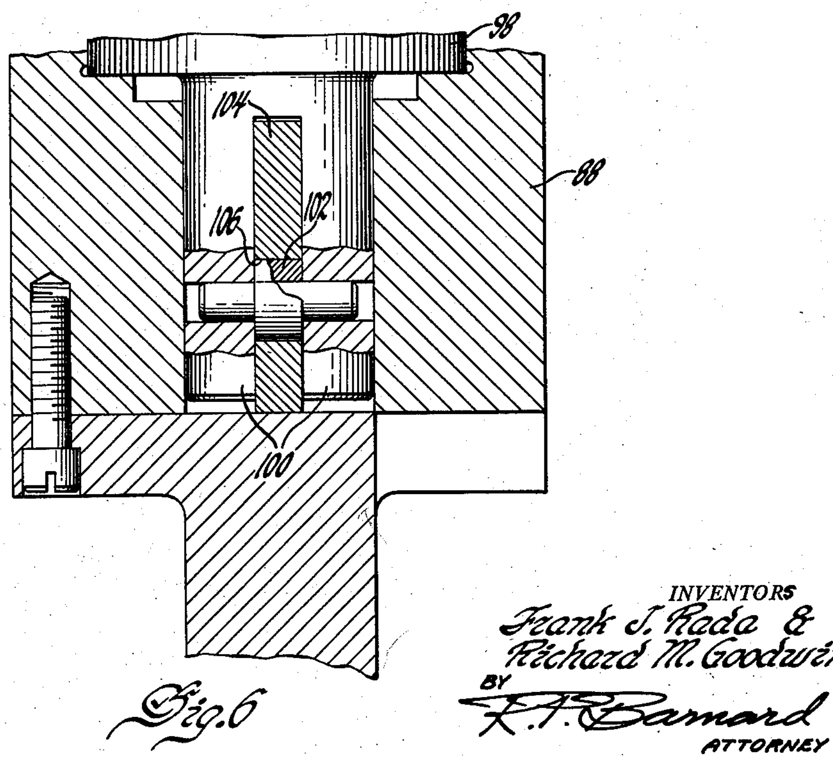
Figure 6 is a fragmentary cross sectional view taken on line 6—6 of Figure 5.

From the above description of the nest and lamp support and controlling mechanism 86, it will be clear that operation of the nest motor 90 will result in the entire mechanism 86 being reciprocated upwardly from the position shown in Figures 2 and 3 to that shown in Figure 4, at which time the V-shaped teeth 94 will engage the openings 96 in the lamp nest skirt 24 to elevate the nest above its mating locating pins 20 and the turret 2. Thereafter, actuation of the lamp motor 112 reciprocates the slide 104 to the position shown in Figure 4 to cause the cam follower 102 to ride upwardly in the track 106 thus elevating the barrel 98 relative to the pedestal 88. During this movement of the barrel 98, the lamp ferrules 44 are seated within the support and contact members 120 to lift the lamp slightly off of the nest 8 so as to engage the respective aiming projections 70, 72 and 74 with the stock removing surfaces of the grinding wheels as shown in Figure 4. It will be apparent that the aforementioned aiming projections lightly engage the grinding wheels under the yieldable influence of the respective springs 130.

At this juncture it may be observed that the surfaces of the respective grinding wheels which engage the aiming projections on the lamp as shown in Figure 4 define a reference plane having a known disposition relative to the plane of the aiming screen 56 shown in Figure 2. More specifically, the reference plane is preferably parallel to the plane of the aiming screen 56 whereby location of the light beam projected from the respective lamps 10 on the aiming screen 56 will result in location of this beam relative to the reference plane and, consequently, the plane defined by the aiming projections or bosses on the lamp. Moreover, and as will appear more fully hereinafter, if the aim of a particular lamp requires correction so as to locate the beam thereof in a predetermined position or disposition relative to the aiming plane defined by the lamp bosses or projections, independent operation of the grinding wheels occurs in order to remove stock from these projections as required. During this stock removal operation, the lamp is yieldably and adjustably fed into the grinding wheels by means of the springs 130. Moreover, upon grinding of one or more projections, the lamp is permitted to pivot about the other projections or projection due to the mounting of the tapered seating surfaces 128 of the tubes 124 on the end cap of plate 116 of the lamp supporting and controlling mechanism aforedescribed.

In order to properly coordinate operation of the nest elevating motor 90 and the lamp elevating motor 112, a limit switch 140 is secured to the lower mounting plate 50 so as to be energized by a pin 142 carried by and extending laterally from the pedestal 88. As a result, upon elevation of the pedestal 88 to the desired extent, the limit switch 140 is energized to activate the lamp motor 112 through suitable circuitry to be described hereinafter. As such time, the previously described cam plate or slide 104 is moved to the position of Figure 4 to elevate the lamp. Upon elevation of the lamp to the desired extent, the cam plate 104 engages another limit switch 144 also mounted on the lower plate 50 which establishes an electrical circuit to the contact members 120 which engage the ferrules 44 to illuminate the lamp filaments to cast a beam pattern on the aiming screen 56.

Figure 7:
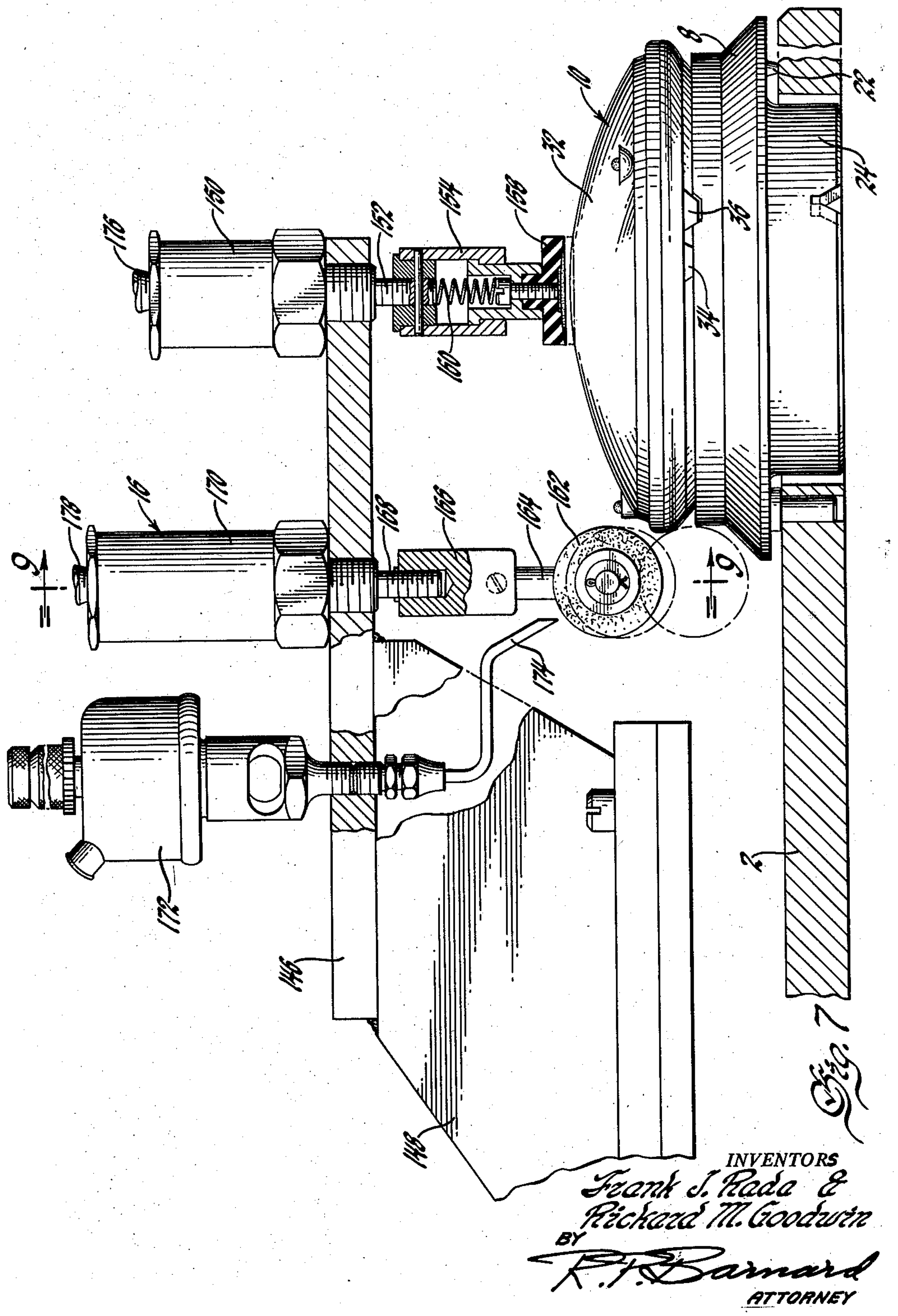
Figure 7 is a cross sectional view taken on line 7—7 of Figure 1 showing the marking station of the apparatus.
Figure 9:
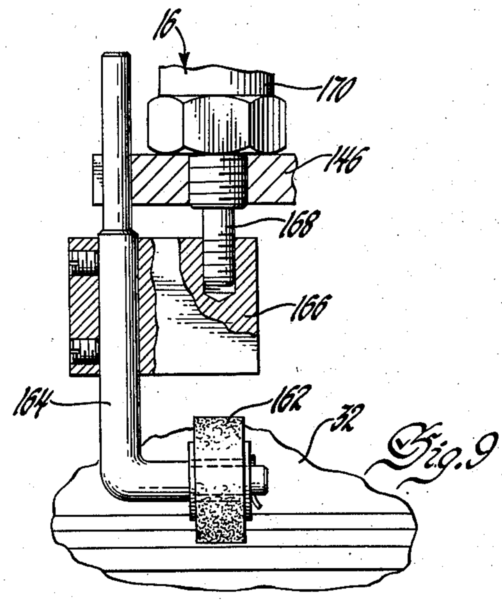
Figure 9 is a fragmentary cross sectional view taken on line 9—9 of Figure 7.

Referring now to the marking station 16 with particular reference to Figures 1, 7 and 9, this station may be seen to include a support plate 146 suitably fixedly mounted relative to the turret 2 by means of a bracket 148. An air-operated motor 150 includes a vertically reciprocable piston rod 152 carrying an adapter head 154. Reciprocably disposed within the adapter head is a lamp retaining or locking plunger 158 adapted to engage the lamp lens 32 as shown in Figure 7, and which plunger is urged downwardly within the adapter head by means of a spring 160. Disposed adjacent the periphery of the flange of the lamp is a roller 162 made of felt or other suitable material rotatably secured to a support rod 164 held in a block 166 adapted for vertical reciprocation on the lower end of the piston rod 168 of the marking air motor 170. The upper end of the support rod 164 is of reduced diameter and extends through an aperture in the mounting plate 146 to maintain the peripheral edge of the marking roller in the position shown relative to the flange of the lamp 10. A container 172 is also mounted on the plate 146 for supplying ink or other suitable marking fluid by gravity feed through the line 174 to drip upon the roller 162 to keep the latter saturated. As will become more clear hereinafter, the respective air motors 150 and 170 are suitably connected by air hoses or lines 176 and 178, respectively, to a source of air under pressure and to suitable control means whereby lamps which have passed the aim inspection and correction station will be marked as good, while lamps which have not passed will not be so marked. As previously mentioned, the pins 22 carried by the nest 8 and engaging the surface of the turret or dial 2 prevent the nest from cocking at the marking station upon actuation of the locking or retaining air motor 150.

Figure 10:
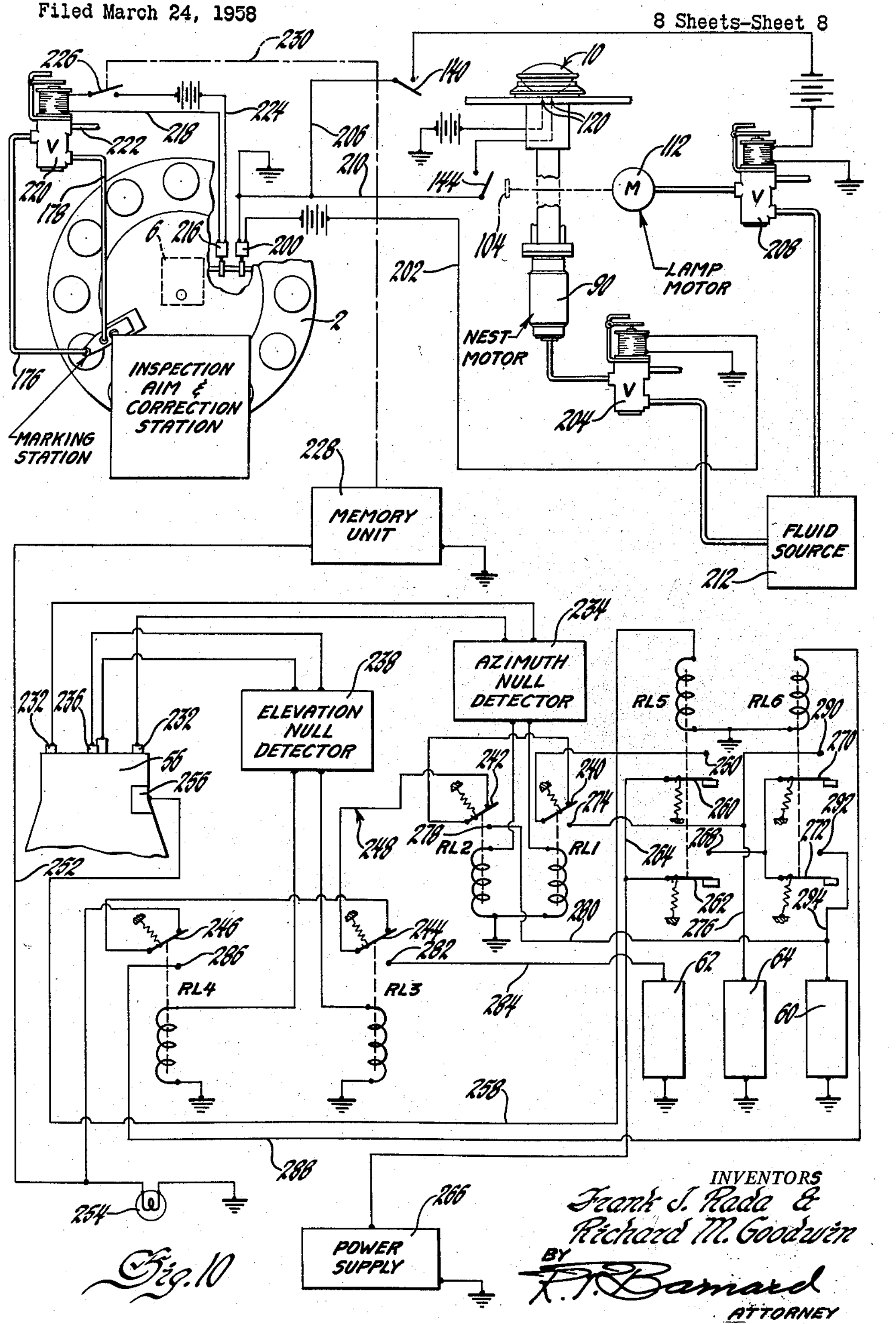
Figure 10 is a diagrammatic view of a control circuitry for operating the apparatus.

Reference will now be made to Figure 10, showing one form of hydraulic and electrical circuitry which may be employed to control the apparatus of this invention. Inasmuch as the individual components of this circuitry are of conventional construction, only a diagrammatic representation of them has been made in the interest of clarity and in order not to obscure the invention. Moreover, inasmuch as the circuitry illustrated diagrammatically is but one way in which the apparatus may be controlled as will be apparent to those skilled in the art, the description to follow should be considered as merely illustrative although being a preferred form of the control means for the apparatus. With respect to the following description, reference numerals employed with the previous description have been used where appropriate in order to relate the previously described mechanism to the circuitry shown.

The upper portion of Figure 10 diagrammatically depicts the electrical and hydraulic circuitry for controlling the operation of the lamp and nest support and controlling mechanism 86 at the aim inspection and correction station (see Figures 2 and 4), and the apparatus at the marking station (see Figure 7). To this end, a micro switch 200 is adapted to be energized by a cam driven by the sequential index drive mechanism 6. The micro switch 200 has a contact connected by a conductor 202 with a source of electrical power, an electro-magnetically operated valve 204 and to ground. The other contact of the micro switch 200 is connected through a conductor 206 with the limit switch 140, the electro-magnetically operated valve 208 and to ground. This other contact of the micro switch 200 is also connected in parallel with the conductor 206 with a conductor 210, the limit switch 144 and to ground. Each of the valves 204 and 208 are suitably connected to a source of air under pressure 212 and, respectively, to the nest elevating motor 90 and the lamp elevating motor 112. The previously described cam plate 104 is indicated in Figure 10 to depict the manner in which it cooperates with the limit switch 144 upon actuation of the lamp motor 112.

With respect to the control circuitry for the marking station, a second micro switch 216 is provided for actuation by a cam driven by the sequential drive mechanism 6. One contact of the micro switch 216 is connected by a conductor 218 to an electro-magnetically operated valve 220 suitably connected to the fluid source 212 by a hose or pressure line 222. The previously described air lines 176 and 178 are adapted to supply air under pressure upon actuation of the valve 220 to the lamp locking or retaining motor and marking motor 150 and 170, respectively. The other contact of the micro switch 216 is connected through conductor 224 with a source of electrical energy, a master switch 226 and to the valve 200. It will be readily apparent that the master switch 226 must be closed in order to establish a circuit to the valve 220 to operate the marking station. However, in the attainment of one object of this invention, the marking station is not energized unless a particular lamp has passed inspection at the aim inspection and correction station 14. In the achievement of this object, the mast switch 226 is adapted to be closed to establish a circuit through the marking station valve 220 in response to a signal from a memory unit 228 which is suitably electrically or mechanically connected as indicated at 230 to the mast switch 226. Thus, and as will appear hereinafter, the mast switch 226 will be closed only upon the memory unit 228 receiving a signal indicating that a particular lamp has passed inspection.

The lower portion of Figure 10 diagrammatically depicts the control circuitry at the aim inspection and correction station 14 for inspecting lamp aim and subsequently, if necessary, altering the heights of the lamp projections or bosses 70, 72 and 74 to establish an aiming plane having a known angular disposition with respect to the direction of the light beam from the lamp, or at least with respect to a selected portion of such beam such as the "hot spot." Prior to proceeding with a description of this portion of the circuitry, it should be observed again that the function of the aim inspection and correction station is to locate the position of the beam provided by the lamp 10 relative to an aiming plane defined by the projections 70, 72 and 74 whereby a mechanical aiming instrument may be employed with the lamp for properly aiming the latter. Upon a particular lamp 10 being indexed into the aim inspection and correction station and elevated relative to the grinding wheels so as to engage the latter as shown in Figure 4, the plane defined by the aiming projections is the plane defined by the portions of the grinding wheels in engagement with the projections; that is, the reference plane which is parallel to the aiming screen 56. Consequently, upon illuminating the lamp and casting the beam thereof onto the aiming screen 56, location of this beam on the aiming screen 56 also locates the beam relative to the reference plane and consequently the plane defined by the lamp projections. At such time, and according to this invention, the grinding wheels 60, 62 and 64 may be independently operated to remove stock from the respective lamp projections until such time as the beam projected from the lamp is disposed in a predetermined desired position on the aiming screen 56 and, consequently, in a known position relative to the aiming plane as altered. Naturally, if the beam directivity is initially in the predetermined known position, it will not be necessary to alter the lamp aiming projections.

With the above factors in mind and referring now to the circuitry of Figure 10, the aiming screen 56 may be seen to be provided with spaced light-sensitive photocells 232 electrically connected to an azimuth null detector 234. Similarly, additional spaced photocells 236 are electrically connected to an elevation null detector 238. As will be apparent to those skilled in this art, the respective azimuth and elevation photocells are so positioned on the aiming screen 56 as to define thereon vertical and horizontal intersecting reference or aiming axes with respect to which the beam pattern from a lamp 10 may be located. When beam directivity is properly located relative to the coordinate aiming axes, the signal provided by the respective photocells will be balanced. Such a condition is usually termed one of good "null" signifying that the lamp is properly aimed on the screen. If the lamp beam is too far to the left or right, the signal to the azimuth null detector 234 will be unbalanced thereby resulting in a voltage output from the azimuth null detector. Similarly, if the lamp beam is too high or too low, a similar voltage output will be provided by the elevation null detector.

One contact of the azimuth null detector which provides an electrical output if the light beam is projected too far to the right on the aiming screen is electrically connected to the relay RL–1. The other contact of the azimuth null detector which provides a voltage output upon the light beam falling too far to the left on the aiming screen is electrically connected to the relay RL–2. Similarly, one contact of the elevation null detector which is provided with a voltage output if the light beam is aimed too low is electrically connected to the relay RL–3. The other contact of the elevation null detector provides a voltage output when the light beam is too high, and is electrically connected to the relay RL–4. Each of the relays RL–1 through RL–4 are suitably operatively electrically or mechanically connected as shown to the normally closed switch arms 240, 242, 244 and 246, respectively, which establish a master series circuit 248 between the contact 250 and a good "null" circuit including the conductor 252 in which the signal lamp 254 is connected. The conductor 252 is also electrically connected to the previously described memory unit 228.

Another light sensitive photocell 256 is supported from the shroud or enclosure of the aiming screen arrangement, and is electrically connected by the conductor 258 to relay RL–5 which is suitably operatively electrically or mechanically connected to the normally open switch arms 260 and 262 connected in parallel to conductor 264 electrically connected to power supply 266. Upon a lamp being illuminated in the aim inspection and correction station so as to cast the beam therefrom on the aiming screen 56, the photocell 256 will be energized to operate relay RL–5 thereby closing switch arm 260 on contact 250 and switch arm 262 on contact 268. As a consequence, an electrical series circuit is established from the power supply 266, through conductor 264, switch arm 260, contact 250 and the relays RL–1 through RL–4 of the master control circuit 248. The aforementioned contact 268 is electrically connected in parallel to the normally open switch arms 270 and 272 which are operatively electrically or mechanically connected to the relay RL–6.

The relay RL–1 operates to close the switch arm 240 on the contact 274 to establish a circuit through the conductor 276 to the operating mechanism for the grinding wheel 64. The relay RL–2 operates to move the switch arm 242 onto the contact 278 to establish a circuit through the conductor 280 to the operating mechanism for the grinding wheel 60. Relay RL–3 operates to move the switch arm 244 onto the contact 282 to establish an electrical circuit through the conductor 284 to the operating mechanism for the grinding wheel 62. Relay RL–4 operates to move the switch arm 246 onto the contact 286 to establish a circuit through the conductor 288 to the relay RL–6 which, as aforementioned, swings the switch arms 270 and 272 onto the contacts 290 and 292, respectively, to establish parallel electrical circuits through conductors 276 and 294 to the operating mechanisms for the grinding wheels 64 and 60, respectively.

Prior to proceeding with a description of the operation of the apparatus, reference may be made to Figure 1 showing a lamp with its aiming projections in order to orient the latter with respect to the direction of the light beam cast thereby. Pre-aimed projection lamps of the type referred to herein, and as more specifically disclosed in the aforementioned application of Arnold and Cole, S.N. 515,684, are adapted to be mounted on a vehicle with the aiming projections 70 and 74 horizontally aligned on an axis substantially parallel to the ground and above the projection 72. The aiming plane defined by these projections can conceivably be oriented with respect to the longitudinal axis of the vehicle in any desired way, but ordinarily this plane is located relative to the lamp beam so that the latter is properly aimed with the aiming plane disposed normal to the longitudinal axis of the vehicle. Consequently, the reference plane defined by the grinding wheels 60, 62 and 64 which is parallel to the plane of the aiming screen 56 may be visualized as being a plane normal to the longitudinal axis of such a vehicle. Consequently, upon engagement of the lamp aiming projections with the grinding wheels as indicated in Figure 4, the aiming plane defined by these projections will likewise be normal to the longitudinal axis of the vehicle. At this time, if the light beam from the lamp falls in the proper area on the aiming screen 56, the lamp will be properly aimed when installed on the vehicle with the aiming plane disposed normal to the longitudinal axis of the latter. However, and with the lamp engaging the grinding wheels as shown in Figure 4, if the light beam falls too far to the right this condition is indicative of the aiming projection 74 being too high relative to the other projections. Similarly, if the beam is too far to the left, the aiming projection 70 is too high. If the beam is too low, the projection 72 is too high, and if the beam is too high, both projections 70 and 74 are too high. Consequently, when one or more of the aiming projections are of an improper relative height, the control circuitry of Figure 10 operates in a manner to be described to alter their respective heights.

In operation, the projection lamp 10 will be mounted on the pedestal 40 at the loading station as shown in Figure 8. Thereafter, the pedestal is lowered as indicated in dotted lines in Figure 8 thereby seating the lamp on the nest 8. When properly seated, the flange of the lamp will engage the limit switch 46 thereby signalling the index drive mechanism 6 that it may proceed with sequentially indexing the turret 2. If the lamp should become cocked or otherwise not properly seated in its associated nest, the switch 46 will not be actuated and the turret will not move until the lamp is properly seated. The drive mechanism then indexes the turret to position the lamp in the aim inspection and correction station as indicated in Figures 2 and 3.

At this time, the micro switch 200 in Figure 10 will be actuated to operate the valve 204 to supply fluid from the source 212 to the nest motor 90 thereby lifting the nest from the turret to the position shown in Figure 4. Upon the end of its upward travel, the pin 142 on the pedestal 88 will operate the limit switch 140 establishing a circuit to the valve 208 to supply fluid from the source 212 to the lamp motor 112. As a result, the cam slide 104 is reciprocated to the position shown in Figure 4 thereby causing the contact members 120 to engage the ferrules 44 on the base of the lamp thereby lifting the latter upwardly until the aiming projections thereon engage the respective grinding wheels. After the cam plate 104 has completed its travel, the limit switch 144 is closed to establish a circuit to the contact members 120 and ferrules 44 to illuminate the lamp thereby casting a beam pattern between the grinding wheels and onto the aiming screen 56. At this time, the springs 130 will lightly yieldably urge the aiming projections on the lamp into engagement with the grinding wheels.

A dwell interval now occurs for the micro switch 200 during which time the lamp is maintained illuminated and the aim inspection and correction operation occurs. Upon illumination of the lamp, a beam therefrom is projected onto the aiming screen 56 so as to be sensed by the photocells thereon. In particular, if the lamp filaments are not defective, the light beam will energize the photocell 256 thereby operating the relay RL–5 through the conductor 258. Operation of the relay RL–5 results in movement of the normally open switch arms 260 and 262 to respectively close on the contacts 250 and 268. As a result, an electrical circuit is completed from the power supply 266 through the conductor 264, switch arm 260, contact 250 and master circuit 248 including respective relays RL–1 through RL–4 to the good "null" circuit 252. At this instant, the contact 268 and open switch arms 270 and 272 connected to relay RL–6 are hot. The function of the aim inspection and correction apparatus will now depend upon whether the lamp is defective and, if it is not, on the location of the light beam projected therefrom with respect to the plane defined by the aiming projections 70, 72 and 74.

One condition which may result is that the light beam projected from the lamp 10 will initially fall in the proper aiming area on the aiming screen 56 as defined by the photocells 232, 236 thereon. When this condition results, the light beam from the lamp is located in a predetermined known position with respect to the plane of the aiming projections 70, 72 and 74 inasmuch as they abut the reference plane defined by the grinding wheels which, in turn, is parallel to the aiming screen. The signals provided by the respective sets of aiming photocells 232 and 236 are balanced thereby providing a good "null" signal to the azimuth and elevation null detectors. Consequently, none of the relays RL–1 through RL–4 are energized, and electrical power flowing from the contact 250 through the master circuit 248 and relays RL–1 through RL–4 illuminate the good "null" signal lamp 254 and signal the memory unit 228 through the conductor 252 that the lamp has passed inspection.

Assume now that the light beam projected by the lamp falls too far to the right of the vertical aiming axis defined essentially by the photocells 236. This condition corresponds to one in which, most simply, the aiming projection 74 is too high relative to the other projections. When such a condition is presented, the intensity of light falling on the azimuth photocells 232 is unbalanced thereby resulting in a voltage output from the azimuth null detector which actuates the relay RL–1 to move the switch arm 240 onto the contact member 274 to establish an electrical circuit through the conductor 276 to the operating mechanism for the grinding wheel 64. The grinding wheel 64 is then operated to remove stock from the projection or boss 74 during which time the lamp is yieldably fed toward this grinding wheel so as to pivot about the aiming projections 70 and 72. This grinding operation continues until such time as the light intensity on the azimuth photocells 232 is balanced at which time there is no voltage output from the azimuth null detector, the relay RL–1 is de-energized and the switch arm 240 is returned to the position shown in Figure 10 to reconstitute the master circuit 248.

If the lamp beam is too far to the left, which corresponds most simply to the aiming projection 70 being too high, a similar operation results with respect to relay RL–2. Thus, an output voltage is provided from the azimuth null detector which activates the relay RL–2 to swing the switch arm 242 onto the contact member 278 thereby establishing a circuit through conductor 280 to the operating mechanism for the grinding wheel 60. The grinding wheel 60 then removes stock from the projection 70 until such time as the light beam intensity is balanced on the azimuth photocells 232 thereby resulting in discontinuance of the voltage signal from the azimuth null detector, de-energization of relay RL–2 and movement of the switch arm 242 back into the master circuit 248 as indicated in Figure 10.

If the light beam should be too low, a voltage signal is similarly supplied by the elevation null detector to operate relay RL–3 to swing switch arm 244 over contact member 282 thereby supplying electrical power through the conductor 284 to the operating mechanism for the grinding wheel 62 which then removes stock from the aiming projection 72 which is too high. The grinding operation continues until the lamp has pivoted about the projections 70 and 74 so as to move the beam cast thereby to a position on the aiming screen in which the light intensity on the photocells 236 is balanced thereby discontinuing the voltage output and de-energization of relay RL–3.

Similarly, if the lamp beam is too high, the voltage signal from the elevation null detector activates relay RL–4 which moves switch arm 246 onto contact member 286 thereby establishing a circuit through the conductor 288 to relay RL–6 thereby swinging the hot switch arms 270 and 272 onto the contacts 290 and 292, respectively. The result is that the operating mechanisms for both the grinding wheels 60 and 64 are actuated to remove stock from projections 70 and 74 until such time as the lamp 10 has been pivoted about the projection 72 to bring the light beam into a balanced position with respect to the elevation photocells 236. When a balanced condition has been achieved, the voltage output from the elevation null detector is discontinued thereby resulting in opening of the relay RL–4 again establishing the master circuit 248.

From the above description, it will be readily apparent that no grinding action will occur under two circumstances. The first circumstance is one in which the lamp is defective in the sense that no light beam is projected upon the aiming screen to activate the photocell 256. Inasmuch as the photocell 256 must be activated to operate relay RL–5 which establishes the master circuit 248, no current is supplied through the relays RL–1 through RL–4 unless the lamp is illuminated. Moreover, if the lamp is not illuminated, no circuit can be made to the good "null" circuit 252 to illuminate the signal lamp 254. The second situation in which no grinding will occur is one in which, although the relay RL–5 closes the master circuit 248 through relays RL–1 through RL–4, good "null" signals are initially obtained in both the elevation and azimuth null detectors as a result of the light beam being initially in the desired predetermined known position with respect to the plane defined by the lamp aiming projections. Inasmuch as the light intensity of the beam of the lamp is balanced upon the respective photocells associated with these null detectors, no voltage output is provided from either detector so that none of the relays RL–1 through RL–4 is actuated. Consequently, the circuit is maintained from the power supply 266 through master circuit 248 including the relays RL–1 through RL–4 in series to the good "null" circuit 252 to illuminate the lamp 254 and indicate a good lamp to the memory unit 228.

It will also be evident that the various switches controlled by the relays RL–1 through RL–4 are connected in series in the master control circuit 248. Consequently, aim correction if necessary will take place in a predetermined sequence; that is, azimuth correction takes place prior to elevation correction. More specifically, the switches associated with each of the relays RL–1 through RL–4 are so related relative to each other in the master series circuit 248 so as to correct for beam directivity in the following sequence: a beam which is too far right on the aiming screen, too far left, too far down and too far up. However, in this regard, it should be noted that this particular sequence is not absolutely essential to the invention although it is the preferred sequence. Furthermore, the above description with respect to azimuth correction has been made with reference to only one boss being of an undesirable relative height. However, it should be recognized that various combinations of heights of the bosses may occur in successive lamps. For example, a lamp 10 may cast a beam which is too far to the right not only because the projection 74 is too high but also due to the boss or projection 72 being too high. Whatever combination of projection heights are encountered, the preferred form of the apparatus will function in the sequence aforedescribed to correct for the component of beam directivity on the azimuth and then for the elevational or vertical component.

As aforedescribed, if a lamp is defective so as not to become illuminated or for any other reason the desired aiming plane is not formed, no circuit can be established to the good "null" circuit 252. Consequently, the signal lamp 254 will not be lighted and the memory unit 228 will be provided with this information for use at the marking station. On the other hand, whether the lamp is provided with a light beam having a predetermined known disposition with respect to the aiming plane initially or whether this relationship is provided by operation of one or more of the grinding wheels 60, 62 and 64, it will be apparent that a good "null" signal will be provided to the good "null" circuit 252 to light the lamp and signal the memory unit to this effect.

Referring now to the operation of the marking station, the micro switch 216 will be sequentially operated to place the conductors 218 and 224 in condition to establish a circuit to the valve 220 to provide air from the source 212 to the respective lines or hoses 176 and 178 supplying air to the lamp retaining marking motors 150 and 170. However, this circuit cannot be established unless the master switch 226 has been closed in response to a good "null" signal supplied to the memory unit 228 acting through the electrical or mechanical linkage indicated schematically at 230. If a good "null" signal has not been received, the switch 226 will remain open and the lamp will not be marked. However, upon a good "null" signal being received, the switch 226 is closed to establish the circuit to the valve 220 thereby activating the lamp locking motor 150 and marking motor 170. The locking motor 150 then causes the plunger 158 to seize the lamp lens 32 to firmly maintain the lamp on its nest 8, the pins 22 serving to prevent the nest and lamp from cocking on the turret 2. The marking motor 150 is similarly actuated to reciprocate the roller 162 downwardly to mark the periphery of the lamp flange to indicate that the lamp has passed inspection.

From the above description, the apparatus of this invention will be seen to be a relatively simple device which may be utilized to mass produce pre-aimed projection lamps in large volume. The apparatus includes a single station in which successive lamps may be inspected generally, and particularly with reference to locating their light beam directions with respect to aiming projections thereon and, if required, the aiming projections ground to define an aiming plane having the aforementioned predetermined known angular relation with respect to beam direction. Still further, because the independently operated grinding wheels establish a reference plane having a known position relative to the aiming screen, lamps which have projections defining such an aiming plane when initially indexed into the aim inspection and correction station will have no grinding operation performed on them at all. Consequently, by avoiding unnecessary grinding of lamps, waste operation and possible breakage of the aiming projections of some lamps is avoided. Additionally significant is the fact that the stock removing tools, herein shown specifically to be grinding wheels, are selectively independently operable to remove material from one or more aiming projections as the lamp is pivotally fed into the grinding wheel about the other projections. As a result, a minimum amount of grinding is required to establish the aiming plane as compared to an operation, for example, in which a single grinding wheel is used to remove stock from all the aiming projections with reference to the lowest aiming projection; that is, an operation in which all projections must be ground in establishing the aiming plane.

It remains to be noted that the embodiment of the invention shown, although the preferred one, has been selected for illustrative purposes only, there being many equivalent structures for the various components of the apparatus which will be obvious to those skilled in the art. It may be mentioned specifically that, although grinding wheels have been disclosed as the tool employed for the removing of stock from the aiming projections, other tools may be used. For example, independently operable diamond wheel saws could be used as long as they have a structure thereon which will abut with the aiming projections and define a reference plane having a known position with respect to the aiming screen for the inspection operation. Therefore, it will be understood that the specific embodiment of the invention herein disclosed has been selected for illustrative purposes only, and in no way is intended to limit the scope of the invention which is defined by the claims which follow.

We claim:

1. Apparatus for use in the manufacture of projection lamps of the type including a reflector and lens enclosing a light source, said apparatus comprising an aiming station including means defining a reference plane, means for positioning a lamp at said station to project the light beam thereof in a known direction with respect to said reference plane, and means at said station for providing the structure of the lamp with a surface defining an aiming plane having a known disposition relative to said reference plane.

2. Apparatus for use in the manufacture of projection lamps of the type including an integrally joined reflector and lens enclosing a light source, said apparatus comprising an aiming station including means defining a reference plane, means for energizing said light source with the lamp disposed in said station, means for positioning the lamp at said station to project the light beam thereof in a known direction with respect to said reference plane, and means at said station for providing the structure of the lamp with plural spaced surfaces which define an aiming plane having a predetermined disposition relative to said reference plane.

3. Apparatus for use in the manufacture of projection lamps of the type including a reflector and lens enclosing a light source, said apparatus including an aiming station; said station comprising tool means engageable with a structure portion of a lamp and selectively operable to remove stock from the latter, said tool means defining a reference plane, support means for the lamp operable to engage the latter with said tool means, and means sensitive to the direction of the light beam of the lamp source relative to said reference plane to selectively operate said tool means to provide an aiming plane on the lamp having a known disposition relative to said reference plane.

4. Apparatus for use in the manufacture of projection lamps of the type including a reflector and lens enclosing a light source, said apparatus including an aiming station; said station comprising tool means defining a reference plane and being selectively operable on a lamp structure to remove stock therefrom, means supporting a lamp in engagement with said tool means, and means sensitive to the direction of the light beam of the lamp source to locate the beam relative to said reference plane, said last-named means being selectively operable to actuate said tool means to provide the lamp structure with an aiming plane having a known angular position relative to said reference plane.

5. Apparatus for use in the manufacture of projection lamps of the type including a reflector and lens enclosing a light source, said apparatus including an aiming station; said station comprising tool means defining a reference plane engageable with a structural portion of a lamp and selectively operable to remove stock from the latter, means for supporting said lamp structural portion in engagement with said tool means, and means sensitive to the directivity of the beam from the lamp to locate the latter relative to said reference plane whereby the position of the plane defined by said lamp structural portion is known relative to the beam directivity, said last-named means being operable to actuate said tool means to alter said lamp structural portion to form an aiming plane having a predetermined known position relative to beam directivity upon the plane defined by said structural portion deviating from said predetermined position.

6. Apparatus for use in the manufacture of projection lamps of the type including an integrally joined reflector and lens enclosing a light source, said apparatus including an aiming station; said station comprising means for energizing the light source, a plurality of indenpendently operable stock removal means defining a reference plane, means for feeding a plurality of spaced portions on said lamp into engagement with said stock removal means, and means sensitive to the direction of the light beam of said source relaitve to said reference plane to independently operate said stock removal means to provide an aiming plane defined by said surface portions which has a known disposition relative to said reference plane.

7. Apparatus for use in the manufacture of projection lamps of the type including an integrally joined reflector and lens enclosing a light source, said apparatus including an aiming station; said station including a plurality of independently operable stock removal tools defining a reference plane, means yieldably urging a plurality of lamp surface portions into engagement with said tools, means for energizing said light source, means for detecting the directivity of the beam from said source relative to said reference plane, said last-named means being operative to independently actuate said tools to provide an aiming plane defined by said lamp surface portions having a known angular relation relative to the beam direction.

8. Apparatus for use in the manufacture of projection lamps of the type including an integrally joined reflector and lens enclosing a light source, said apparatus including an aiming station; said station comprising a plurality of independently operable stock removal means defining a reference plane, means for supporting said lamp with a plurality of surface portions thereof engaging said stock removal means, means for energizing the light source of said lamp, means for locating the light beam from said lamp source relative to said reference plane, and means controlled by said last-named means for selectively operating said stock removal means to provide an aiming plane defined by said lamp surface portions having a known position relative to said reference plane.

9. Apparatus for use in the manufacture of projection lamps of the type including an integrally joined reflector and lens enclosing a light source, said apparatus including an aiming station; said station including a plurality of independently operable stock removal tools defining a reference plane, means feeding a plurality of surface portions of said lamp into engagement with said tools, means for energizing said light source, means including an aiming screen parallel to said reference plane for detecting the directivity of the light beam from said source relative to said reference plane, said last-named means being operative to actuate said tools to provide an aiming plane as defined by said lamp surface portions having a known angular relation relative to said beam directivity.

10. Apparatus for use in the manufacture of projection lamps of the type including an integrally joined reflector and lens enclosing a light source, and said lamp including plural spaced aiming projections on the forward portion thereof, said apparatus including an aiming station; said station comprising an aiming screen, a plurality of independently operable tools each having a cutting surface which defines a reference plane having a known position relative to said aiming screen, support means for said lamp whereby said projections are fed against said tool cutting surfaces, means on said aiming screen for detecting the directivity of the light beam from said lamp source, said last-named means being operable to selectively actuate said tools to alter said aiming projections thereby defining an aiming plane having a known angular relation to beam directivity.

11. Apparatus for use in the manufacture of projection lamps of the type including an integrally joined reflector and lens enclosing a light source, and said lamp having a plurality of spaced aiming projections, said apparatus including an aiming station; said station including an aiming screen for detecting the position of the beam from said light source, a plurality of independently operable tools each having a cutting surface which defines a reference plane parallel to said aiming screen, support means for said lamps, means for moving said support means toward said tools whereby said aiming projections are urged into engagement with said tool cutting surfaces, and means operable in response to beam directivity to independently operate said tools to alter said aiming projections to provide an aiming plane having a known angular position relative to beam directivity.

12. Apparatus for manufacturing a projection lamp of the pre-aimed type comprising a support for the lamp, means for energizing the light source of the lamp for projecting a light beam therefrom, an aiming screen on which said beam falls, a plurality of independently operable tools each having a cutting surface defining a reference plane parallel to said aiming screen, means for moving said support to place said lamp into engagement with said tools, and means on said aiming screen for detecting the directivity of said beam relative to said reference plane, said tools being independently selectively operable in response to said last-named means to provide a plurality of spaced surface portions on said lamp defining an aiming plane having a known angular position with respect to beam directivity.

13. Apparatus for the manufacture of pre-aimed projection lamps of the type comprising an integrally joined reflector and lens enclosing a light source and a plurality of aiming projections on said lens, said apparatus including an aiming station; said station comprising an aiming screen, a plurality of independently operable tools each having a cutting surface which defines a reference plane parallel to said aiming screen, a lamp support movable relative to said tools to engage the cutting surfaces of the latter with said projections, means for adjustably mounting said lamp on said support, means for energizing the light source of said lamp to project a light beam on said aiming screen, means on said aiming screen for detecting the directivity of said beam relative to said reference plane, and means responsive to said last-named means to independently operate said tools whereby said aiming projections are altered to define an aiming plane having a known angular position relative to beam directivity.

14. Apparatus for manufacturing pre-aimed projection lamps of the type comprising an integrally joined reflector and lens enclosing a light source and including a plurality of spaced aiming projections, said apparatus including an aiming station having an aiming screen, a plurality of independently operable stock removal tools which define a reference plane parallel to said aiming screen, a movable support head for said lamp, means for yieldably and adjustably mounting said lamp on said support head, means for moving said support head relative to said tools to yieldably and adjustably urge said aiming projections into engagement with said tools, means on said aiming screen for detecting the directivity of the light beam from said lamp relative to said reference plane, means responsive to said last-named means to independently operate said tools in a pre-determined sequence to remove stock from said aiming projections whereby the latter will define an aiming plane having a known angular position relative to said beam directivity; a marking station, said marking station including means for marking said lamps in which the desired directivity of said light beam has been achieved, and means for actuating said marking means in response to a signal from said beam directivity detecting means.

15. Apparatus for the manufacture of projection lamps of the type including an integrally joined reflector and lens enclosing a light source and having a plurality of spaced aiming projections thereon, said apparatus comprising an aiming station including an aiming screen, a plurality of independently operable tools which define a reference plane parallel to said aiming screen, means for yieldably supporting said lamp with the aiming projections thereof in engagement with said tools, said yieldable support acting to feed said lamp toward said tools as the latter are operated, light sensitive means on said aiming screen for locating the directivity of the lamp light beam relative to said reference plane, and control means responsive to said last-named means for independently operating said tools in a predetermined sequence to alter said aiming projections whereby the latter define an aiming plane having a known angular relation to said light beam, said control means being operable when said light beam is projected in an undesired direction relative to said reference plane.

16. Apparatus for use in the manufacture of projection lamps of the type comprising an integrally joined reflector and lens enclosing a light source and having a plurality of spaced aiming projections, said apparatus including an aiming station; said station comprising an aiming screen, a plurality of independently operable stock removal tools defining a reference plane parallel to said aiming screen, support means adjustably feeding said lamp toward said tools with said aiming projections in engagement with said tools, light sensitive means on said aiming screen for determining the directivity of the lamp light beam relative to said reference plane, an elevation null detector electrically connected to one set of said light sensitive means for determining the elevational component of directivity of said light beam, an azimuth null detector electrically connected to another set of said light sensitive means for determining the horizontal component of directivity of said light beam, said light sensitive means establishing a tolerance area on said aiming screen in which said lamp beam should fall, a power supply for actuating said grinding wheels, said power supply being connected in series with a good null circuit through a plurality of relays, respective ones of said relays being energizable to establish a circuit between said power supply and various ones of said stock removal tools, the relays for correcting horizontal aim being electrically connected to said azimuth null detector and the relays for correction of elevational aim being connected to said elevation null detector, whereby said relays will be closed to provide a good null signal and no correction grinding will occur when said lamp aiming projections define an aiming plane having a known angular position with respect to the lamp beam which falls within the tolerance area on said aiming screen.

17. In the manufacture of a lamp of the type including a lens and reflector enclosing a light source, a method for forming an aiming plane on the lamp having a known angular relation to the direction of the light beam projected from the lamp source, said method comprising the steps of mounting said lamp adjustably relative to an aiming screen, engaging a plurality of spaced surface portions of said lamp against a plurality of independently operable stock removal tools which define a reference plane having a known position relative to said aiming screen, energizing the lamp source to project a light beam on said aiming screen, determining the direction of said light beam relative to said reference plane, and removing stock from said lamp surface portions by independent operation of said tools according to the directivity of said beam as located on said aiming screen until a desired directivity of said beam is achieved relative to said reference plane.

18. In the manufacture of a projection lamp of the type including a reflector and lens enclosing a light source, a method for forming an aiming plane on the lamp having a known angular relation to the direction of the light beam projected from the lamp source, said method comprising the steps of mounting said lamp adjustably relative to an aiming screen, engaging a plurality of spaced surface portions of said lamp against a plurality of independently operable stock removal tools which define a reference plane having a known position relative to said aiming screen, energizing the lamp source to project a light beam on said aiming screen, determining the direction of said light beam relative to said reference plane, removing stock from said lamp surface portions by independent operation of said tools according to the directivity of said beam as located on said aiming screen until a desired directivity of said beam is achieved, and marking each lamp in which said desired directivity is achieved.

19. In the manufacture of a projection lamp of the type including an integrally joined reflector and lens enclosing a light source, a method for forming an aiming plane on the lamp having a known angular relation to the direction of the light beam projected from the lamp source, said method comprising the steps of mounting said lamp adjustably relative to an aiming screen, yieldably urging a plurality of projections on said lamp lens against a plurality of independently operable stock removal tools which define a reference plane having a known position relative to said aiming screen, energizing the lamp source to project a light beam on said aiming screen, determining the direction of said light beam relative to said reference plane, removing stock from said projections by independent operation of said tools in a predetermined sequence according to the directivity of said beam as located on said aiming screen until the desired directivity of said beam is achieved relative to said reference plane, and marking each lamp in which said desired directivity is achieved.

References Cited in the file of this patent

UNITED STATES PATENTS

| | | |
|---|---|---|
| 1,687,504 | Moffit et al. | Oct. 16, 1928 |
| 1,712,147 | Kelsea | May 7, 1929 |
| 1,760,693 | Gustin | May 27, 1930 |
| 2,151,736 | Broughton | Mar. 28, 1939 |
| 2,154,500 | Elmendorf | Apr. 18, 1939 |
| 2,272,055 | Carlson | Feb. 3, 1942 |
| 2,493,206 | Okey | Jan. 3, 1950 |
| 2,880,557 | Todd et al. | Apr. 7, 1959 |